United States Patent [19]

Alford

[11] 4,261,613
[45] Apr. 14, 1981

[54] CONVERTIBLE VAN

[76] Inventor: Thomas E. Alford, Rte. 1, Box 620, Texarkana, Ark. 75502

[21] Appl. No.: 107,529

[22] Filed: Dec. 27, 1979

[51] Int. Cl.$^3$ .............................................. B60P 3/00
[52] U.S. Cl. .................................... 296/156; 4/483; 105/377; 296/165; 296/172; 296/157
[58] Field of Search ............... 296/156, 157, 160, 162, 296/164, 165, 15, 171, 172, 175, 176, 216, 84 M, 84 N, 26; 105/377, 374, 370; 410/121, 127, 129; 4/321, 323, 444, 447, 448, 458, 478, 479, 483, 602, 615, 617

[56] References Cited

U.S. PATENT DOCUMENTS

| | | | |
|---|---|---|---|
| 1,454,618 | 5/1923 | Bronks | 4/458 |
| 2,329,419 | 9/1943 | Reed | 296/176 |
| 2,431,264 | 11/1947 | Lynett | 4/321 |
| 2,466,378 | 4/1949 | Charteris | 4/602 |
| 3,602,545 | 8/1971 | Lindenbauer | 296/156 |
| 3,743,346 | 7/1973 | Senn et al. | 296/164 |
| 4,036,520 | 7/1977 | Zuidema | 296/157 |

FOREIGN PATENT DOCUMENTS

| | | | |
|---|---|---|---|
| 2709169 | 9/1978 | Fed. Rep. of Germany | 296/164 |
| 1344265 | 10/1963 | France | 296/162 |

*Primary Examiner*—John P. Silverstrim
*Assistant Examiner*—Ross Weaver
*Attorney, Agent, or Firm*—Dennis T. Griggs

[57] ABSTRACT

A van having a forward cab section and a rear passenger/cargo section is convertible to a tall wall pickup or camper shell configuration by an overhead door or roof panel which is movable from a position overlying and covering an overhead roof opening to an upstanding vertical position. The movable roof panel defines a partition between the cab section and the rear passenger/cargo section, thereby providing a tall wall, open cargo area or camper conversion space. The van is equipped with a side wall door opening and docking receptacles for receiving stub tow bar beams of a trailer vehicle wherein the trailer can be towed by the van to a camping location, uncoupled from the rear of the van and docked into engagement with the side wall door opening, thereby augmenting the living space within the van through its side door opening. The living space within the van is further augmented by moving the overhead roof panel section to its upstanding position and covering the roof opening with a boat in an inverted position, or with a flexible, waterproof covering draped over arched supports. The living space within the van is further augmented by a retractable deck panel which is movable along the longitudinal axis of the van to extend the van floor. In this arrangement, the rear doors are engagable with the deck panel in its extended position to form upstanding side walls. Each rear door is provided with a retractable door panel which is movable from a fully retracted position in which it is totally enclosed within the door to a fully extended position, and each retractable door panel is pivotally mounted for swinging movement for closing engagement with the deck panel, thereby defining a rear closure for the augmented passenger/cargo space. An additional roof panel section is mounted for pivotal movement from a position overlying the van interior to a position overlying the deck panel and is engagable with the top edges of the rear doors, thereby completely enclosing the augmented passenger/cargo space.

16 Claims, 16 Drawing Figures

CONVERTIBLE VAN

BACKGROUND OF THE INVENTION

1. Field of the Invention

The invention relates generally to multiple purpose vehicles, and in particular to convertible recreational van construction.

2. Description of the Prior Art

Recreational vehicles include generally travel trailers, fifth wheelers, tent and camping trailers, pickup campers, motor homes and vans. In view of the increasing limitations on the availability of natural resources for fuel and construction, the van vehicle represents the best combination of living/cargo space and fuel economy. The van is a multiple purpose vehicle that maximizes the use of available resources. When used as a recreational vehicle, the van is especially popular with couples and families with one or two small children. It makes an excellent camping rig for weekends and short vacations. Additionally, the van provides good, economical second car transportation during the week as a general purpose utility vehicle, i.e., for transport of cargo or for passenger (van pooling) transport.

Because of its versatility, the potential benefits of the van vehicle extend beyond the opportunity to save fuel and money by commuter pooling. In addition to the normal use of the van for passenger transportation, the van has the potential of being used for two additional purposes, for cargo transportation and as a camper shell for recreational purposes. Consequently there is an obvious monetary savings in the initial purchase price of a van as opposed to the cost of three separate vehicles. The impact of the initial purchase cost of a multiple purpose van is eased somewhat with camper accessories being added later as the owner's personal budget allows. The saving of resources and fuel used to construct one vehicle instead of three is a substantial conservation measure. Additionally, the use of the van under pooling arrangements for job commuting purposes represents an efficient use of fuel and resources.

In view of the diminishing availability and constantly rising costs of fuel, the multiple purpose van must be adapted as an efficient user of energy. To overcome the rising construction costs and fuel costs, the trend in van construction has been towards smaller van body sizes. As the conventional van diminishes in size, its usefulness for recreational purposes also diminishes.

A practical way to adapt the van as an efficient recreational vehicle, for serving an average size family in comfort, is to construct a van vehicle in which the living space can be expanded or contracted according to a specific purpose. It is, therefore, the principal object of the present invention to provide a van vehicle that is convertible from a normal passenger carrying van configuration to a camper shell that accommodates space expanding, camping accessories. According to this arrangement, a conventional passenger van can be converted into a fully self-contained recreational vehicle that provides stand-up camping and sleeping room for six people, including four adults if necessary.

A related object of the invention is to provide a passenger van which is convertible to a general purpose utility van in the form of a tall wall, open top pickup truck. According to this arrangement, the cargo space is substantially increased and tall cargo loads can be secured more effectively by anchoring the load at both high and low locations.

Another object of the invention is to provide a van vehicle which is easily convertible into a camper shell, and in which the living space can be quickly enlarged by docking engagement with a towable trailer.

Yet another object of the invention is to provide a van vehicle which is quickly convertible from a passenger vehicle to a tall wall open top configuration.

A related object of the invention is to provide a wind deflector for use on a recreational vehicle during highway driving, and which can be used as a privacy screen when the van is being used for camping purposes.

Another object of the invention is to provide a van body construction having double rear doors which may be used to expand the living/cargo space.

SUMMARY OF THE INVENTION

The foregoing objects are achieved in a van having a forward cab section and a rear passenger/cargo section which is convertible to either a tall wall pickup configuration or to an open camper shell configuration. The van is provided with an overhead door or roof panel which is movable from a position overlying and covering an overhead roof opening to an upstanding vertical position, thereby defining a movable partition between the cab section and the rear passenger/cargo section. In this configuration, the van provides either a tall wall, open cargo area or a camper conversion space.

The van is equipped with a side wall door opening and docking receptacles for receiving stub tow bar beams of a trailer vehicle wherein the trailer can be towed by the van to a camping location, uncoupled from the rear of the van and docked into engagement with the side wall door opening, thereby augmenting the living space within the van through its side door opening. The standing space within the van is augmented by covering the open roof section with a boat in its inverted position, or with a flexible, waterproof covering draped over arched supports.

The living/cargo space within the van is further augmented by a retractible deck panel which is movable along the longitudinal axis of the van to provide an extension of the van floor beyond the end of the van. In this arrangement, the rear doors are engagable with the deck panel in its extended position to form upstanding side walls. Each rear door is provided with a retractible door panel which is movable from a fully retracted position, and which is totally enclosed within the door, to a fully extended position, and each retractible door panel is pivotally mounted for swinging movement for closing engagement with the deck panel, thereby defining a rear closure for the augmented living/cargo space. An additional roof panel section is mounted for pivotal movement from a position overlying the van interior to a position overlying the deck panel and is engagable with the top edges of the rear doors, thereby completely enclosing the augmented living/cargo space.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

DETAILED DESCRIPTION OF THE PREFERRED EMBODIMENTS

In the description which follows, like parts are marked throughout the specification and drawings with the same reference numerals, respectively. The drawings are not necessarily to scale and in some instances portions have been exaggerated in order to more clearly depict certain features of the invention.

Figure 9:
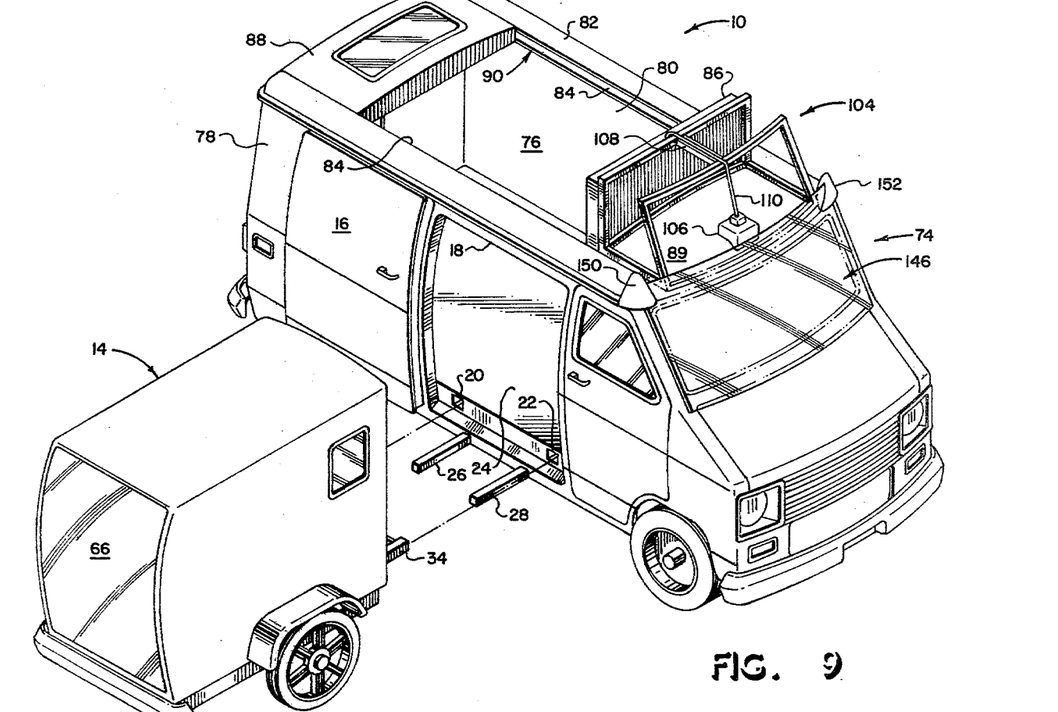
FIG. 9 is a right front perspective view which illustrates docking engagement of a trailer with the convertible van.

Referring now to FIGS. 1-4 and FIG. 9, a van vehicle 10 is provided with a trailer hitch 12 for towing a trailer 14. The van vehicle 10 is provided with a side wall door 16 which is movable from a closed position (FIG. 1) to an open position (FIG. 9) thereby exposing a doorway 18 which provides access to the interior of the van. The side wall door 16 is preferably of the sliding door type which may be completely moved from the doorway entry in its fully open position, as shown in FIG. 9.

According to an important feature of the invention, a pair of open ports 20, 22 define docking receptacles which extend beneath the floor 24 of the van substantially at a right angle with respect to the longitudinal axis of the van. A pair of docking stabilizer bars 26, 28 are slidably received within the framework of the van beneath the van floor 24 and are movable from a retracted position underneath the van floor to an extended position (FIG. 9) wherein a substantial portion of each docking stabilizer bar projects laterally from the side of the van beneath the side wall door opening 18.

Figure 10:
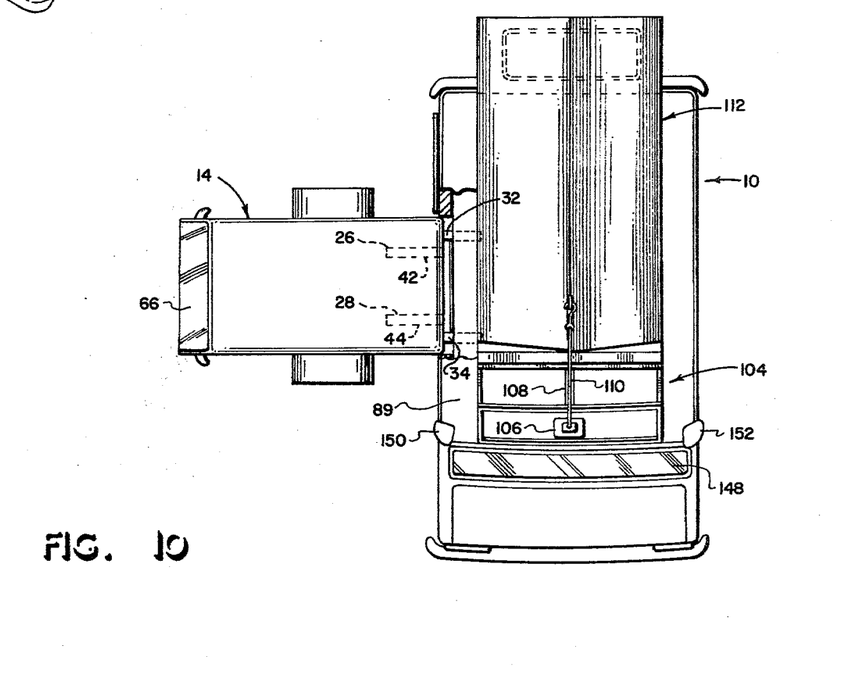
FIG. 10 is a top plan view which illustrates docking engagement of the trailer with the convertible van in its hard top expanded camper shell configuration.

The trailer 14 is provided with a tow bar assembly 30 which includes a pair of parallel beam stubs 32, 34 which are laterally spaced and supported at an elevation corresponding with the spacing and elevation of the docking receptacles 20, 22, respectively. The tow bar assembly 30 further includes a pair of converging tow bar beams 36, 38 which are removably connected to the beam stubs 32, 34, respectively, and are joined together in an apex structure which includes a trailer hitch socket 40 which receives the trailer hitch ball of the trailer hitch assembly 12 carried by the van. Additionally, the forward deck of the trailer 14 is provided with a pair of docking ports 42, 44 for receiving the left and right stabilizer bars 26, 28, respectively, during docking engagement as illustrated in FIG. 10. According to this arrangement, the trailer 14 can be towed by the van, as shown in FIG. 1, to a camping location, uncoupled from the rear of the van and docked into engagement with the side wall door opening after removal of the converging tow bar beams, thereby augmenting the living space within the van through its side door opening, as illustrated in FIGS. 9 and 10.

Figures 1, 2:
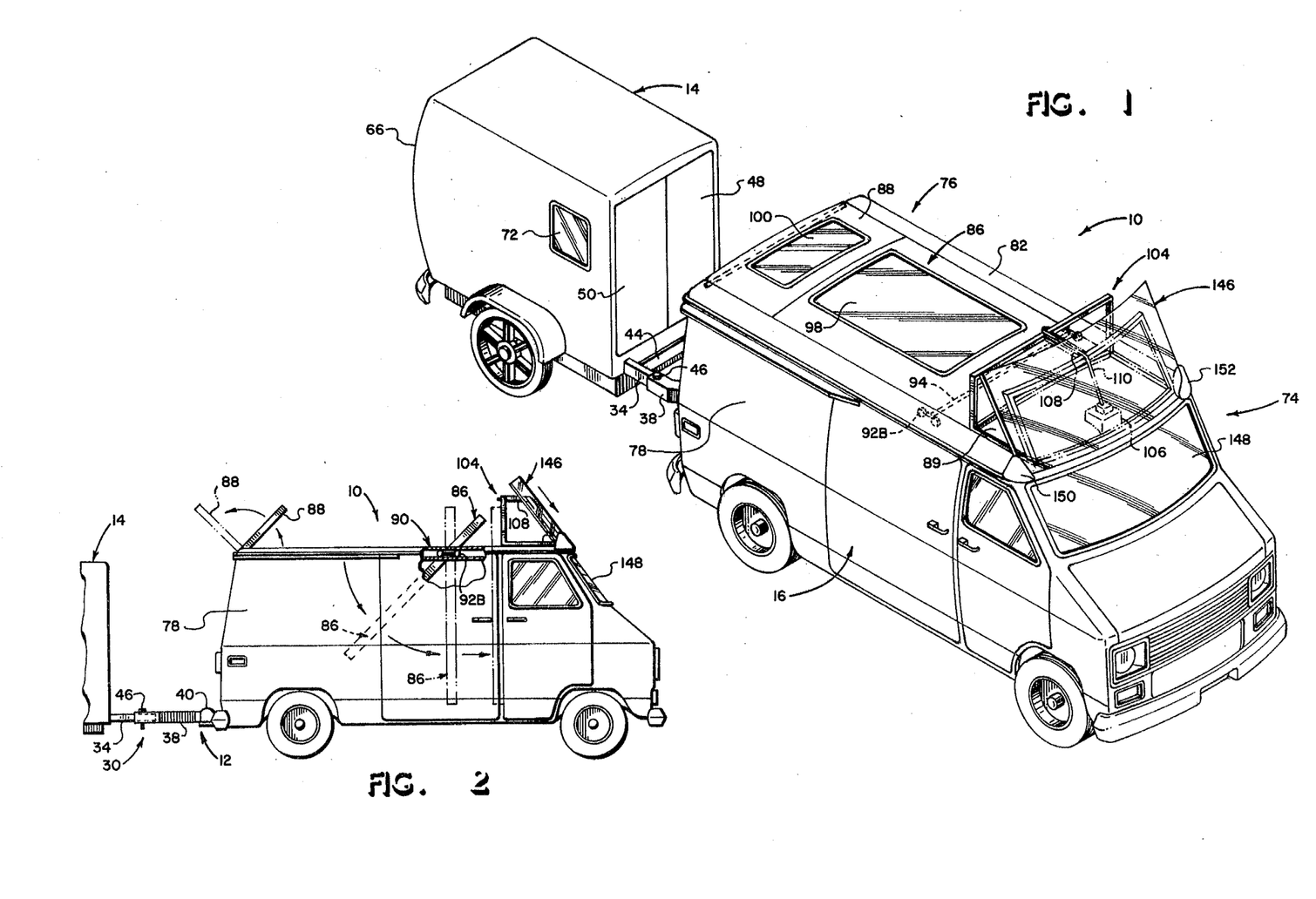
FIG. 1 is a perspective view of a convertible van assembly constructed according to the teachings of the invention.
FIG. 2 is an elevation view, partly in section, of the convertible van shown in FIG. 1.
Figure 3:
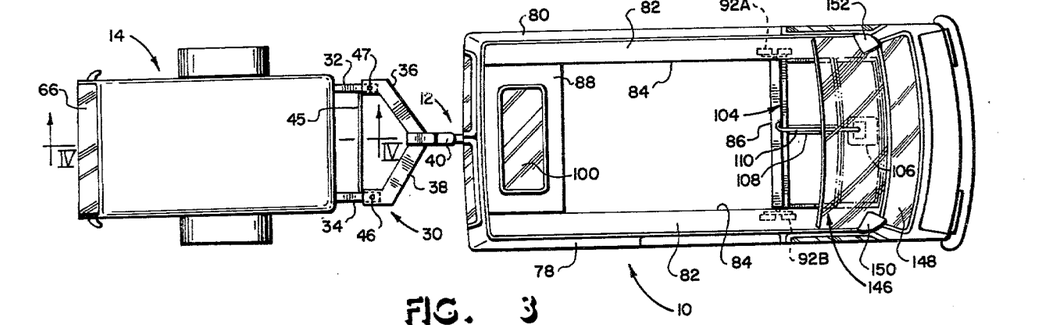
FIG. 3 is a top plan view of the convertible van assembly.
Figures 4, 5:
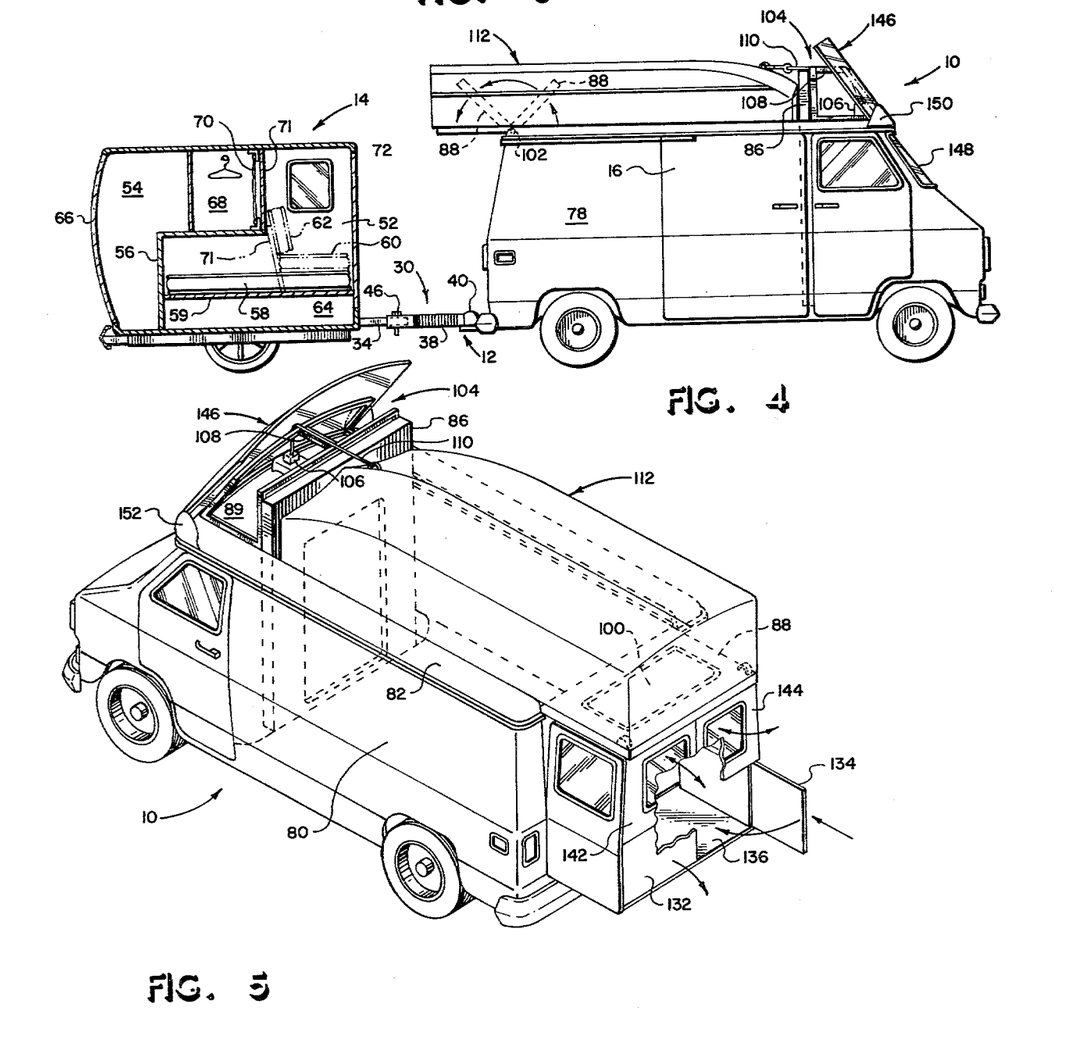
FIG. 4 is a right side elevation view, partly in section, of the convertible van assembly.
FIG. 5 is a left rear perspective view of the convertible van in a hard top expanded camper shell configuration.

As can best be seen in FIGS. 2, 3 and 4, the tow bar assembly 30 is formed in two major sections, the parallel tow bar beam stubs 32, 34 and the converging tow bar beams 36, 38. The converging beams are structurally reinforced by a cross brace 45, and are received in telescoping engagement with the stubs 32, 34. The converging beam segments are releasably connected to the beam stubs by lock pins 46, 47. Removal of the apex section from the tow bar assembly allows the stub beams 32, 34 to be fully inserted into the docking ports 20, 22, respectively.

The combination of the trailer 14 with the van 10 in docking engagement through the side door opening 18 substantially expands the sheltered living space of the van. The trailer provides room for a double bed, a sofa, hanging wardrobe space, battery/generator storage space, and outside storage space. Referring to FIG. 4, the trailer body is approximately six feet long and its width permits its face to fit inside the side door opening 18, filling it completely for a snug fit at all sides of the main door frame. As previously discussed, the tow bar frame assembly 30 separates into two sections. The beam stubs 32, 34 comprise straight, two feet long sections near each bottom corner. As the trailer front fits into the door port, the beam stubs 32, 34 slide into the docking ports 20, 22 for support of the docked trailer. Similarly, the retractable stabilizer bars 26, 28 are extended from the side of the van just below the side door port and extend laterally from the side of the trailer and below the beam stubs for insertion into the docking receptables 42, 44 carried by the trailer 14. This arrangement provides alignment of the trailer for accurate docking into the door opening.

Once the trailer is docked, its two front door panels 48, 50 are opened and removed to be used as doors across the rear augmented living/cargo space (FIGS. 5 and 6), thereby separating that area from the main interior of the van. A sofa/bed is contained within a forward trailer compartment 52, 54 by means of an insulated partition 56. In the bed configuration, a bed mattress 58 is laid out on a removable sub-flooring plank 59 overlying a battery/generator storage area 64. In the sofa configuration, a pair of cushions 60, 62 are stacked at the front of the mattress to make a sofa, and are placed over the docking zone to convert the sofa into a six and one-half foot long double bed. A curtain 70 is used to cover the wardrobe space 68 when the wardrobe door panel 71 slides down to become the back support of the sofa. This same door panel 71 also becomes the support for the sofa cushions to extend the bed length to six and one-half feet over the docking zone.

Battery/generator storage space 64, located under the bed frame, is accessible from the outside, and the rear compartment 54 serves as a storage compartment which is accessible from the outside through a door 66. The partition 56 is an insulated wall which separates the bedroom space 52 from the rear storage area 54. The rear area 54 extends along the height and width of the trailer's rear opening, which is sealed by the rear door 66. The door 66 is preferably made of clear plastic and is incorporated into a separate aspect of the invention, which will be explained hereinafter.

Disposed between the rear storage compartment 54 and the forward sofa/bed compartment 52 is a hanging wardrobe closet space 68. The wardrobe closet space 68 is concealed with respect to the sofa/bed compartment 52 by means of a curtain 70 and sliding door 71. Clothing in the wardrobe compartment 68 is left in place even when using the bed, since it is separated from the sleeping area by the insulated partition 56 and by the curtain 70 or door 71. The clothing also offers thermal insulation for cold weather camping. Small windows 72 are preferably located on each side of the forward portion of the trailer for ventilation and view.

According to a preferred arrangement, an appliance module, e.g. oven/range with cabinet, (not illustrated) is mounted on rollers that permit the module to be wheeled aboard the van with the help of a ramp and an electric winch, to be described hereinafter. The module is transported in the main van and then at the campsite it is moved into the rear van compartment onto the subfloor deck plate 136 (FIG. 5) and connected to permanently installed gas and/or electrical service lines. The top portion of the compartment above the rear roof panel section 88 (FIG. 5) is used for storage purposes, leaving room in the main van for a refrigerator and a kitchen sink module, also mounted on rollers. In this arrangement, there is room for a dinette/bed combination which also may be easily removed when the vehicle is used as a pickup truck or for passenger transportation purposes.

When used in combination with the appliance module, the front doors of the trailer are removed when the trailer is docked and are used as doors across the rear compartment, thereby separating that area from the main interior of the van. To aid in wheeling the appliance module on board, a ramp comprised of two panel sections is used. Each is long enough to fit across the width of the van interior between the rooftop channels on each side. Each end of these ramp sections are fastened into the channels and serve as storage areas or as beds. The ramp panels may also be arranged together to form a double bed having dimensions of approximately four and one-half feet by six feet. When divided, it provides two single beds, each about three feet by four and one-half feet. This flexibility provides sleeping and camping room for a family of six when also using the trailer bed and the dinette/bed. The ramp sections are conveniently fastened to the van walls, or inside the trailer during travel and for storage when not being used.

Turning now to FIGS. 1, 2, 9 and 16, the van 10 is provided with a forward cab section 74 and a rear passenger/cargo section 76. The rear passenger/cargo section is enclosed by upstanding side walls 78, 80 and an overhead roof housing 82. According to an important feature of the invention, an overhead opening 84 is formed in the roof housing 82 and an overhead roof panel 86 removably covers the overhead opening, with the overhead panel 86 being releasably engaged with the roof housing and being supported for rotation from a position overlying and covering the roof opening, as illustrated in FIG. 1, to an upstanding position, as illustrated in FIGS. 2, 3, 9 and 16, wherein the aft portion of the roof panel projects vertically downwardly into the van interior and a forward portion of the roof panel projects through the roof opening 84 above the van. The purpose of this arrangement is to seal the driver/passenger cab compartment and provide a tall wall, open cargo area or camper conversion space. With this conversion of the van roof section, a tall wall pickup truck is created, as well as an open roof which can be covered by either a hard top or soft top waterproof cover. The sealing of the driver/passenger cab section provides the safety feature of a pickup truck, that is separating cargo with respect to passengers, and also provides a capability of being rapidly converted to use as a normal van. The movable overhead roof panel makes possible the conversion of a normal van to a tall wall pickup or to a completely self-contained camper.

Figure 16:
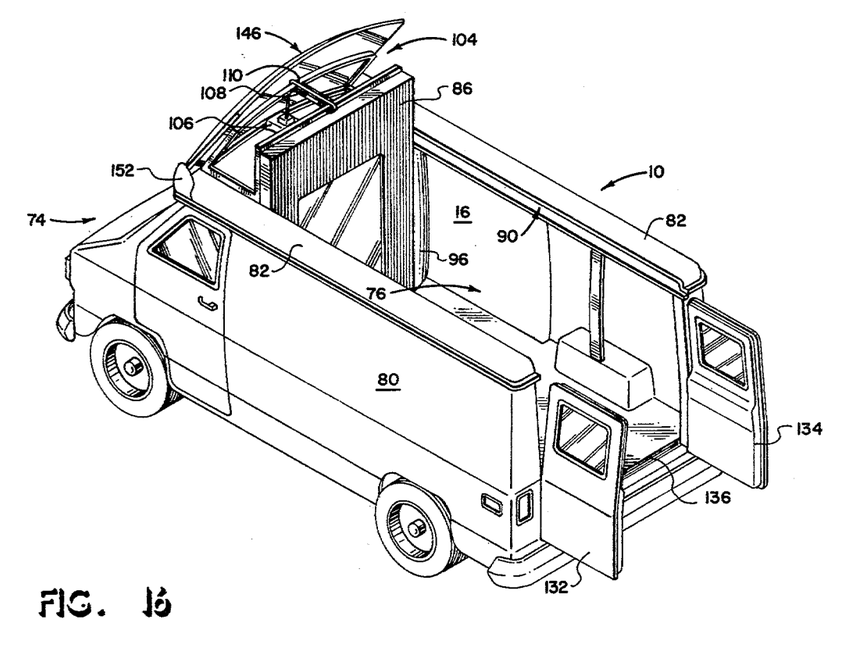

The overhead roof panel 86 is adapted to be easily opened and closed so that the van may be quickly converted from a normal van to either a tall wall pickup or a camper shell. The section of the roof panel involved extends in width from a point on each side of the roof corresponding to the interior width of the van between wheel housings. The length of the overhead roof panel section 86 extends rearwardly from a point directly behind the front seats of the cab compartment to the end of the roof. The overhead roof panel 86, when removed and rotated to its upstanding position as shown in FIGS. 9 and 16, converts the van into a pickup with tall walls or into a shell for camper conversion. The movable roof section is preferably divided into the forward roof panel section 86 and a smaller rear panel section 88. Only the smaller rear roof panel section 88 need be removed completely. The fixed roof section remaining over the front seats will be referred to as the cab roof section 89. The intermediate section, identified as the forward roof panel section 86, has a length sufficient to enable it to stand upright from the floor of the van to height extending about two and one-half feet above the van roof line. The smaller rear roof section 88 comprises the remainder of the roof from the rear end of the forward section to the end of the van. All distances are approximate, with the reference to a 125" wheel base, 1979 model Chevrolet van.

The remaining side sections 82 on either side of the roof opening 84 house a track assembly 90. The rack assembly 90 comprises a linear channel in which a roller carriage assembly 92 is received. The roller carriage assembly is identified as 92A on the left side and 92B on the right side in FIG. 3. The purpose of the roller carriage assembly is to support the forward roof panel section 86 for sliding movement through the roof opening 84. The forward roof section is pivotally mounted on an axle 94 which is supported on each side by the roller assemblies 92A, 92B, respectively. The axle 94 is secured to the roof panel section at about two and one-half feet from the front of the cab roof section. The roller carriage assemblies 92A, 92B permit the roof panel section to be displaced forwardly at the same time that it is pivoting about the axle 94. After completion of the rotation and rolling movement, the aft end of the forward roof panel section rests in flush engagement against the van floor, with the forward end of the roof panel section projecting above the van roof line. The sides of the forward roof panel section are locked in place against permanently installed abutments on each side of the van interior just behind the front seats. The abutments 96 extend from floor to roof and from the sides of the van into the interior so that when the roof section swings into place, the driver/passenger compartment 74 becomes an enclosed cab similar to that of a pickup truck.

The forward roof panel section 86 preferably comprises an elongated, "moon" or "sun" tinted window section 98. The window section 98 also serves as a door between the cab section 74 and the passenger/cargo section 76. The smaller rear roof panel section 88 also contains a tinted window section 100. The rear roof panel section is provided with pivot stubs 102 (FIG. 4) which permit it to be rotated to a position extending over the trailer hitch area as illustrated in FIGS. 2, 4 and 5. The rear roof panel section 88 preferably is connected to the pivot stubs 102 near its rearmost end, just above the rear van doors. This small roof section serves as both a rear window and also serves as the frame for a top bunk bed or shelf, as illustrated in FIG. 5. When rotated 90° straight up from front to rear, so that it is standing upright over the rear doors, the roof panel 88 serves as a window in an optional van hard top configuration, to be explained hereinafter. In the horizontal position as shown in FIG. 5, the rear roof panel section 88 serves as a bunk bed frame or shelf in the optional hard and soft top configurations. The rear roof panel section 88 may also hang down out of the way during optional top loading/unloading procedure, to be explained hereinafter. Further, its axle stubs 102 are releasable with respect to the roof housing so that the smaller rear panel section may be completely removed in the tall wall pickup configuration.

Optional storage space is provided on top of the fixed van roof cab section 89 by a frame housing assembly 104, as can best be seen in FIGS. 1, 2 and 5. The frame housing assembly 104, which is collapsible and easily removable, serves several important purposes. The frame housing assembly is preferably constructed of a lightweight, high strength material such as aluminum. The frame housing assembly is braced by the upper end of the forward roof panel 86, as illustrated in FIGS. 4 and 5. The frame housing assembly encloses auxiliary equipment such as a portable water tank, a gas water heater (not shown) and an electric winch 106 with control lines extending into the cab interior through the side abutment 96. Equipment within the frame housing assembly 104 is preferably concealed by lightweight, removable panels (not illustrated) at the sides. It is also enclosed by a forward wind deflector panel 146, which forms a separate part of the invention, to be explained hereinafter. The frame housing abuts the upwardly projecting forward roof panel section 86 when that section is in its cab partitioning position. The front of the frame housing rests close to the top front edge of the van. The frame housing extends substantially along the width and height of the roof panel section above the van roof line.

The electric winch 106 is mounted on the fixed roof section and is centered in or on the roof near the front, just below the frame housing. Aligned with the winch is a cable guide bar 108 which is extended in alignment with the longitudinal center line of the van, and which structurally reinforces the frame housing assembly. The guide bar 108 serves as a guide for the winch cable 110. The winch is used to load and off-load an optional, camper "hard top" cover. The winch cable 110 also serves as the apex support for an alternate "soft top" and/or solar roof, to be explained hereinafter.

According to a preferred embodiment, the living space within the van is enlarged and the stand-up room is increased by covering the roof opening 84 with a hard top cover in the form of a boat 112 as can best be seen in FIGS. 4, 5 and 10. The boat 112 is preferably twelve feet long by four and one-half feet wide by two feet deep. The boat top extends from the vertically projecting forward roof panel section 86 to about two and one-half feet beyond the rear of the van. The boat section which projects beyond the rear of the van also serves as a roof for an augmented passenger/cargo space, according to another important aspect of the invention, to be explained hereinafter. The boat is coupled to the track assembly 90 by rails 114 which extend and retract with respect to the track assembly 90. In the extended position, the boat is raised up and/or out by the distance necessary to come together with the track assembly 90. The railing 114 contains a number of small rollers (not illustrated) which interlock with the roof tracks so that the boat may be pulled smoothly aboard by the electric winch 106. When off-loaded, the railing 114 is retracted flush with the top side of the boat.

Figure 13:
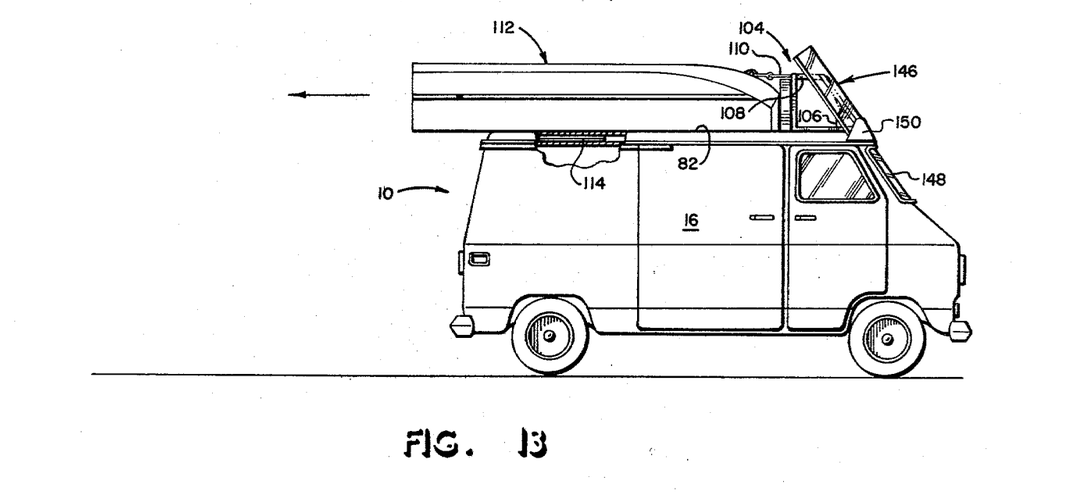
FIGS. 13, 14 and 15 are right side elevational views which illustrate a preferred method for off-loading a boat from the top of the convertible van; and, FIG. 16 is a left rear perspective view of the van in its tall wall pickup configuration.
Figure 14:
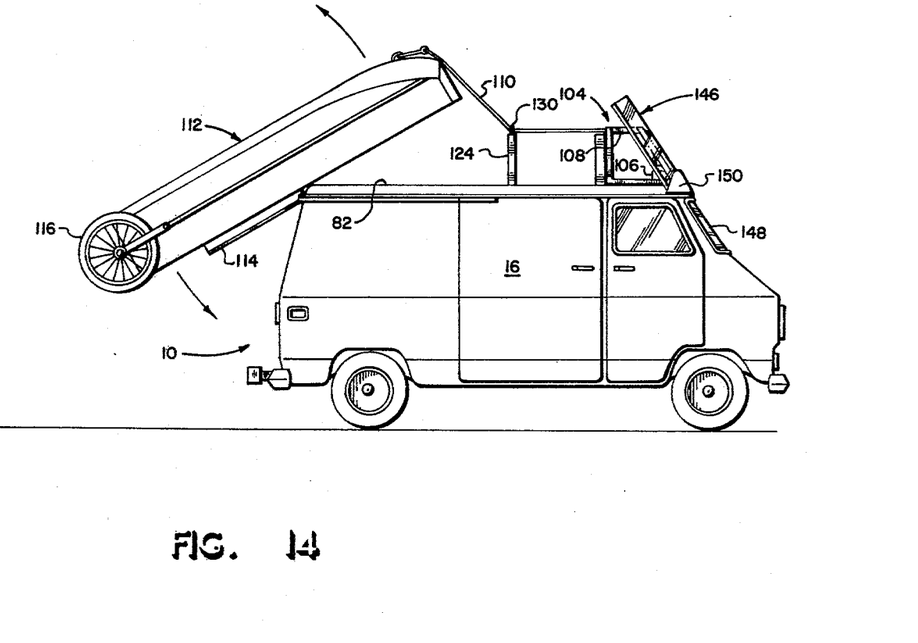
Figure 15:
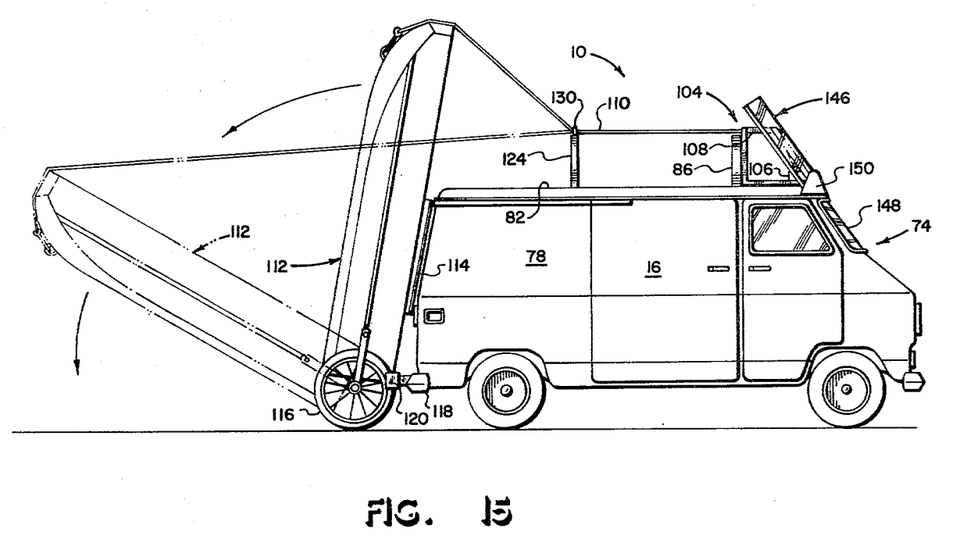

Referring to FIGS. 13, 14 and 15, a flip-over system is used for loading and off-loading the boat 112. For example, in off-loading the boat, a rod (not shown) is inserted between the end railing rollers on each side near the boat's mid length point. The boat is then wheeled along the track assembly 90 until the boat extends halfway off the rear of the van, as shown in FIG. 14, and the rod catches at the rear end of the roof side sections and retains the railing 114. When the rod catches, the boat is manually flipped over from front to rear. As the boat rotates, the rod is used as a pivotal axis and the winch and cable are used as a braking system.

At some convenient time during the off-loading procedure, bicycle wheels 116 (FIGS. 14, 16) are attached to the rear of the boat. When the boat has completed its rotation, the railing 114 lies flush against the rear of the van and the bicycle wheels engage the ground adjacent the rear van bumper 118. The bicycle wheels 116 are then anchored to the van bumper 118 by means of a clamp 120 whereupon the boat is then free to rotate to a ground level position, using the wheel hubs as a pivotal axis.

In the remount loading position, the bicycle wheels 116 are positioned in the same place at the rear of the van for correct alignment of the boat with the railing interface 114. The boat is then rotated in a clockwise direction into engagement with the track assembly 90 as the winch is used to pull it over and onto the side section tracks for rolling to its top covering position. The bicycle wheels may be used to move the boat to and from a launch area, and are preferably removed and stored separately when not being used.

Figure 6:
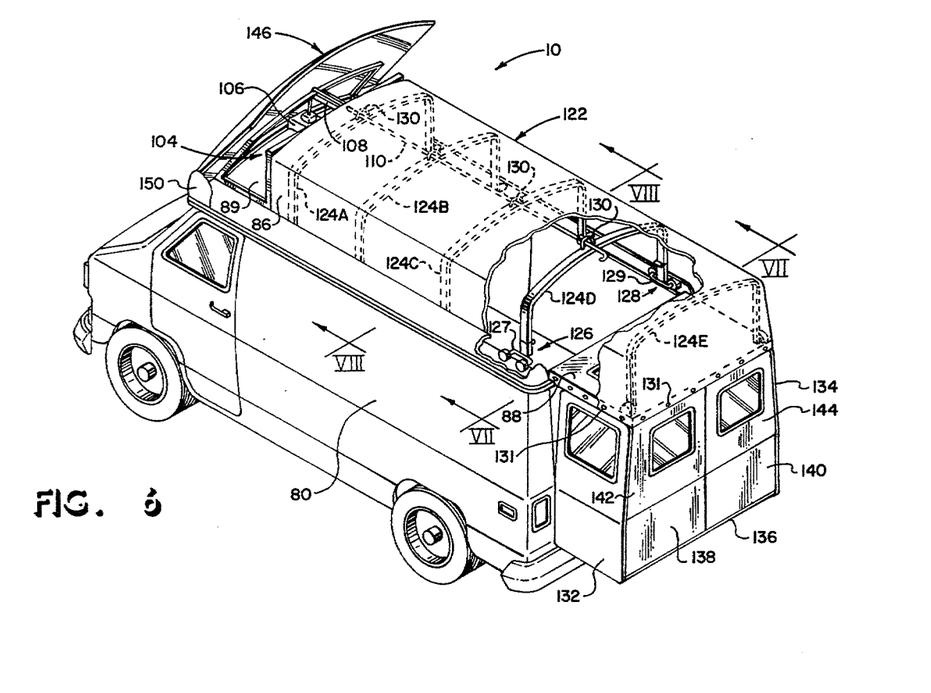
FIG. 6 is a left rear perspective view of the convertible van in a soft top expanded camper shell configuration.
Figure 7:
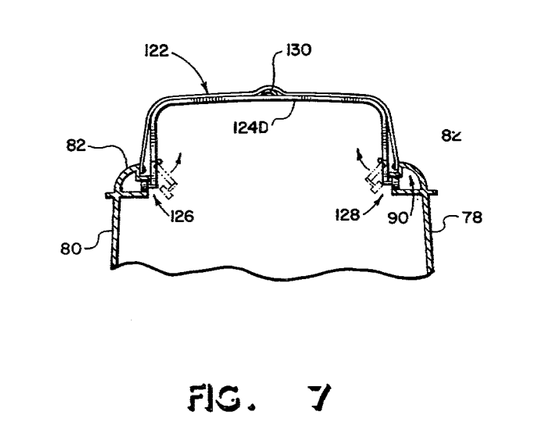
FIG. 7 is a sectional view taken along the lines VII—VII of FIG. 6.
Figure 8:
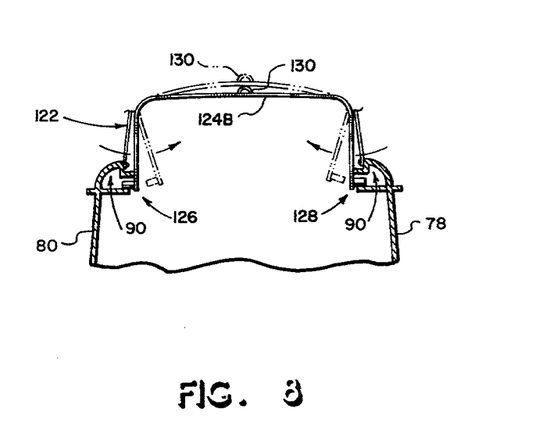
FIG. 8 is a sectional view taken along the lines VIII—VIII of FIG. 6.

Referring now to FIGS. 6, 7 and 8, the camper shell may be enlarged in a soft top configuration by the use of a flexible, waterproof canvas cover 122 which is draped over and supported by an array of arched support frames 124A, 124B, 124C, 124D and 124E. Each arched support frame is constructed of a high strength, resilient metal such as steel. The arched support frames are mounted on roller assemblies 126, 128, which are journalled on yokes 127, 129, as can best be seen in FIG. 6. Each support frame is arched slightly and extends at approximately the same height as the upwardly projecting end portion of the panel partition 86. A guide loop 130 attached at the top of each support frame receives the winch cable 110.

As can be seen in FIG. 14, a relatively rigid arched support frame 124D is used as a strain relief for loading and off-loading the boat. After the boat has been off-loaded, the arched support frame 124D is rolled to the forward end of the van where it serves as one end of the frame for the soft top 122. The arched support frames 124A, B, C and E are flexible and are mounted within the track assembly 90 by springing them inwardly as indicated in FIG. 8 and then releasing the end stubs into engagement with the track.

The soft top provided by the canvas cover 122 in combination with the arched support frame gives the appearance of a "covered-wagon" structure. It will be appreciated that flexible solar panels with photo-voltaic cells may be mounted on each side of the flexible roof top, with the fabric extending from the panel bottom ends to fasten to the roof side sections by means of snap fasteners 131. When not in use, the solar panels may be stored with the fabric folded around and in between them for protection.

The living space within the van in its camper shell configuration is expanded as shown in FIG. 6 by the rear doors 132, 134 which open and close a rear entrance to the passenger/cargo section, and a retractable sub floor deck plate 136 which is movably received within the van floor 24 and horizontally movable along the longitudinal axis of the van to provide an extension of the van floor beyond the end of the van. The rear doors 132, 134 are engagable with the sub floor deck plate 136 in its extended position to form upstanding side walls for the extended floor region.

Received within each rear door is a retractable door panel 138, 140 which are movable from a fully retracted position in which the panels are totally enclosed within the rear doors to fully extended positions. Each retractable door is pivotally mounted for swinging movement into closing engagement with the sub floor deck plate 136, thereby defining a rear closure for the enlarged passenger/cargo space. To complete the closure, extra framed windows 142, 144 slide or swing out to rotate from the outward edges of the van's rear doors. In transport, these framed windows rest against the interior of the doors' normal windows, in effect creating double windows.

This augmented living space may be used as a rear compartment containing a sofa/bed and a top bunk bed or a preferred arrangement for housing an appliance module and top shelf. In the hard cover configuration, with the rear doors lined up beneath the boat, panels received within the sides of the boat are pulled down to cover the small gap between the boat top and the doors. The panels lock at the inside top of the doors and gives support to the compartment assembly.

The sub floor deck plate 136 beneath the van floor slides out at the rear into the gap between the doors. The deck plate rests on small ledges built along the inside of the doors and is sufficiently wide enough to fill the space from side-to-side and front-to-rear between the doors. As previously discussed, the doors themself also house panels and serve as a base for two extra, framed windows which complete the compartment enclosure. The panels 138, 140 pull out and swing around from their edges to fasten to each other and to the plate flooring. As can best be seen in FIG. 5, each door has window panel sections 142, 144 which may be opened independently of the lower door panel sections 132, 134. The window frame sections 142, 144 slide or swing out to cover the remaining open space in the rear compartment wall.

In the configuration shown in FIG. 5, the smaller rear roof panel section 88 is rotated clockwise into the rear of the boat until it is resting upside down on ledges built within the sides of the boat. This section and the two-foot depth of the boat provides a storage shelf or a bunk bed compartment for a child.

With the soft top in place as shown in FIG. 6, the depth of this compartment could be expanded, starting from the approximately two and one-half foot height of the arched support frame. A bed/sofa or appliance module may be located directly below the top bunk or shelf in the augmented rear compartment. The sofa/bed support also rests upon door ledges. The appliance module rests upon the extendable deck plate flooring.

Referring again to the frame housing assembly 104, a wind deflector 146 is movably mounted on the cab section 74 from a fully retracted position projecting above the van windshield 148 (FIGS. 1, 2 and 6) thereby defining a deflector for use during highway driving, and moving to a position overlying the substantially covering the cab windshield (FIG. 9) for privacy when the van is being used for camping purposes. The wind deflector 146 thus serves as an air stream deflector when traveling, for privacy when camping, and further as a mobile billboard for advertising, if desired. The panel 146 is constructed of a clear, lightweight plastic. An advertising mural may be adhered to the inner side of the panel. Such a mural (not illustrated) would preferably be made of Mylar/vinyl laminate. This combination wuld make the panel transparent from the inside and opaque when viewed from the outside. The plastic rear door 66 of the trailer could also be used as a mobile billboard. The rear plastic door 66 of the trailer is preferably of the same dimensions as the front panel 146, but is carried in a vertical format on the trailer 14.

To serve as a privacy screen over the van windshield 148, the wind deflector 146 is received on each side by guide housings 150, 152. Electric motors (not illustrated) or mounted crank gears mounted in each housing at each front corner of the van drive the deflector panel 146 into full extension and retraction with respect to the windshield 148. In its uppermost, fully retracted position, the wind deflector rests on the rain gutter near the front top of the van. The wind deflector is angled backwards at the same slope as the windshield to reduce wind resistance. In its other principal position, the deflector extends downwardly over the cab windshield, and is supported by the hood, but the panel remains upright at approximately the same rearward angle as the van windshield. In this position the panel conceals the windshield and provides privacy for the cab region of the van. This position further allows clearance when parking in a garage. To provide see-through visibility from the inside, the wind deflector is preferably plastic, transparent from the inside, but opaque when viewed from the outside.

Figure 11:
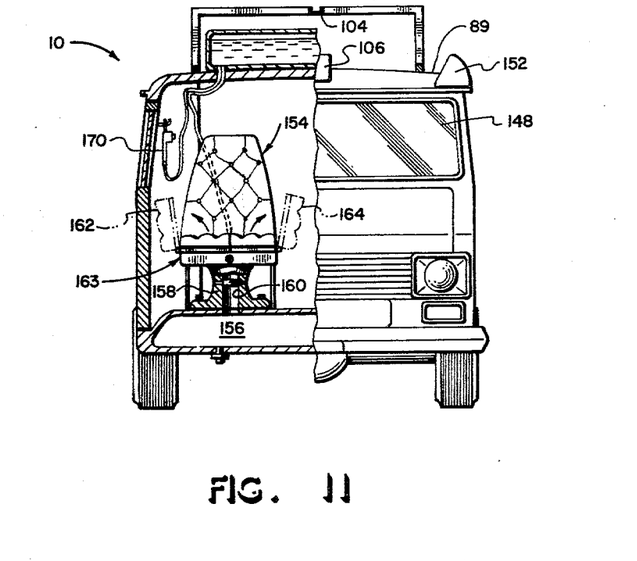
FIG. 11 is a front elevation view, partly in section, of a combination shower/toilet fixture in the convertible van of FIG. 1.
Figure 12:
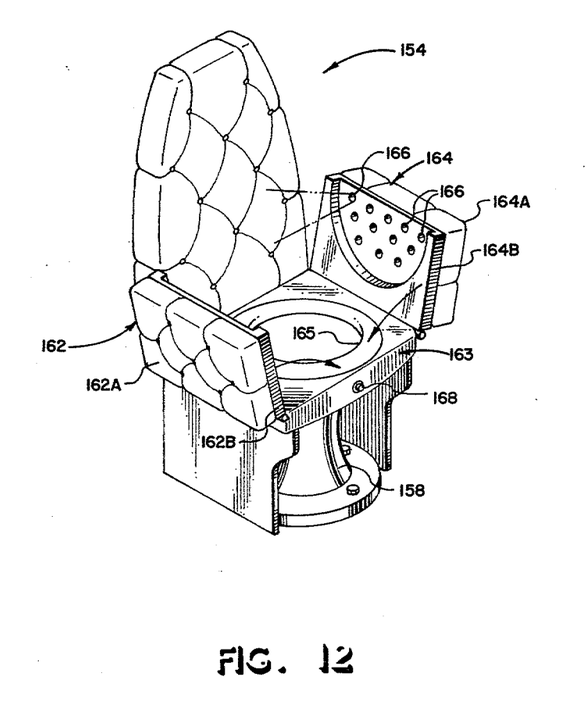
FIG. 12 is a right front perspective view of the combination shower/toilet fixture of FIG. 11.

Referring now to FIGS. 11, 12, a combination shower/toilet assembly 154 is incorporated in the passenger seat within the cab compartment. A drainage tank 156 is housed beneath the van floor 24, and is preferably connected to an exhaust burning system (not shown) for waste disposal purposes. The passenger bucket seat assembly 154 is supported on a stool 158 having a central drainage passage 160 connected to the tank 156. Mounted on top of the stool 158 is a toilet housing 163 including a bowl 165. First and second cushion sections 162, 164, each having an outer cushion layer 162A, 164A, respectively, and a water spray housing 162B, 164B, respectively, carried beneath the cushion layer. Each water spray housing is provided with a plurality of fluid discharge openings 166 for discharging a shower of water into the zone above the bowl 165 when the cushion sections are fully open.

This shower/toilet facility is built into the passenger/bucket seat. The toilet bowl 164 and its drainage pipe 160 are housed within the stool just below the cushion seat bottom, with the septic tank 156 below the van floor. The seat bottom is divided into half sections 162, 164 which are split from front to rear. Each half is rotatable up and away from center, preferably stopping at an angle from approximately 110°–135° with respect to horizontal. The hinged, seat bottom halves 162, 164 serve, in effect, as cushioned shower heads with adjustable angles to spray throughout the zone above the bowl 165. A conventional toilet seat (not shown) in the form of a removable vinyl-covered cushion is stored separately and may be installed for use by placing it on top of the bowl 165.

The bowl 165 allows some shower drainage, with another drain being located in the van floor 24. Water supply for the shower/toilet assembly is conducted from a roof top water tank located in the frame housing assembly 104 or is connected directly to a permanent water outlet. The area of the van floor around the shower/toilet seat is shielded by a sloped, fiberglass covering having a floor drain into the septic tank 156. Shower curtains may be used if desired, and the seat covering is preferably vinyl or other water resistant fabric that may be wiped dry.

The plumbing lines from the external water tanks or supply are carried and concealed within the vertical side panel abutment 96. The shower action is controlled by means of a valve actuator 168 which controls the delivery of water to the spray nozzles for showering or flushing purposes. A hand held shower head 170 is also connected to the water supply.

From the foregoing description of preferred embodiments of the invention, those skilled in the art will appreciate that a convertible van has been disclosed which is capable of being converted into a tall wall, open cargo area or completely self-contained camper. With the rearrangement of the van roof section, a tall wall pickup truck is created, as well as an open roof which gives campers a choice of either a hard top or soft top living space. The van is thus quickly adapted as a commuter vehicle for passenger transportation, as a general purpose utility truck for hauling cargo, and as an expandable camper shell for recreation purposes.

Although preferred embodiments of the invention have been described in detail, it should be understood that various changes, substitutions, and alterations can be made therein without departing from the spirit and scope of the invention as defined by the appended claims.

What is claimed is:

1. In combination:

a van vehicle having a trailer hitch for towing a trailer and a side wall door movable from a closed position to an open position providing access to the interior of the van, a pair of open ports defining docking receptacles extending under the floor of the van substantially at a right angle to the longitudinal axis of the van, and at least one docking stabilizer bar slidably received in the framework of the van beneath the van floor and movable from a retracted position underneath the van floor to an extended position wherein a substantial portion of the docking stabilizer bar projects laterally from the side of the van beneath the side wall door opening; and a trailer vehicle adapted to be towed behind the van having a tow bar projecting forwardly of the trailer, said tow bar being characterized by a pair of parallel beams which are laterally spaced and supported at an elevation corresponding with the spacing and elevation of the docking receptacles, and a pair of converging tow bar beams removably connected to the parallel beams and terminated by a trailer hitch coupling member for detachably engaging the trailer hitch of said van, and having an open port defining a docking receptacle extending beneath the floor of the trailer for receiving the docking stabilizer bar;

wherein said trailer can be towed by said van to a camping location, uncoupled from the rear of the van and docked into engagement with the side wall door opening after removal of the converging tow bar beams, thereby augmenting the living space within said van through its side door opening.

2. In a van vehicle of the type having a forward cab section and a rear passenger/cargo section enclosed by upstanding side walls and an overhead roof housing, the improvement comprising an overhead opening formed in said roof housing and an overhead roof panel removably covering said overhead opening, said overhead panel being releasably engaged with said roof housing and being supported for rotation from a position overlying and covering the roof opening to a substantially vertical position wherein the aft portion of the roof panel projects vertically into the van interior and a forward portion of the roof panel projects through the roof opening above the van, and wherein said roof panel is mounted for sliding movement to a forward position adjacent the cab section thereby forming a vertical, tall wall partition between the cab section and the rear passenger/cargo section.

3. The van as defined in claim 2, the van roof housing defining the side boundaries of the roof opening being provided with a channel extending along the length of the opening, and wherein rollers are attached to opposite sides of the forward end of the roof panel and are disposed for horizontal rolling movement along the channels.

4. The van as defined in claim 2, the roof panel comprising a transparent door which serves as a sun roof when the roof panel is in its horizontal, top side position, and which serves as a window or doorway when the panel is moved to its upstanding position between the cab and passenger/cargo sections.

5. The van assembly as defined in claim 2, including a smaller roof panel section abutting the rotatable roof panel section and covering the remainder of the roof opening from the rear of the rotatable section to the end of the van, the smaller roof panel section being pivotally mounted about a horizontal axis for rotation from a horizontal position overlying the interior of the van to a horizontal position extending rearwardly of the van and overlying the trailer hitch.

6. In a van vehicle of the type having a cab compartment enclosed by a windshield, the improvement comprising a wind deflector movably mounted on said cab section from a fully retracted position projecting above the windshield thereby defining a wind deflector for use during highway driving, and movable to a position overlying and substantially covering the windshield for cab privacy when the van is being used for camping purposes.

7. The van combination as defined in claim 6 including drive means coupled to opposite side edges of the wind deflector for extending, retracting and locking the wind deflector in place with respect to said windshield.

8. The van combination as defined in claim 6 wherein said wind deflector is opaque thereby defining a privacy screen.

9. In a van vehicle of the type having a forward cab section and a rear passenger/cargo section formed by a floor, upstanding side walls and a roof section, and rear doors which open and close a rear entrance to the passenger/cargo section, the improvement comprising a retractable sub floor deck panel movably received within the floor of the van and horizontally movable along the longitudinal axis of the van to provide an extension of the van floor beyond the end of the van, and said rear doors being engagable with the sub floor panel in its extended position to form upstanding side walls for the extended floor region, and said rear doors each receiving in slidable engagement a retractable door which is movable from a fully retracted position in which it is totally enclosed within the rear door to a fully extended position, each retractable door being pivotally mounted on its associated rear door for swinging movement into closing engagement with the sub floor deck panel, thereby defining a rear closure for the augmented passenger/cargo space.

10. The van vehicle combination as defined in claim 9, wherein said roof comprises a movable end panel which is pivotally mounted between the van side wall sections for rotational movement from a position overlying the van interior to a position overlying the sub floor panel in its extended position and engagable with the top edges of the rear door, thereby enclosing the augmented passenger/cargo section.

11. In a van vehicle of the type having a forward cab section and a rear passenger/cargo section enclosed by upstanding side walls, an overhead roof section and rear doors which open and close a rear entrance to the passenger/cargo section, and an overhead opening formed in said roof along the length of the passenger/cargo section, the improvement comprising:
 a first overhead roof panel removably covering the forward portion of said overhead opening, the first overhead panel being releasably engaged with said roof section and being supported for rotation from the position overlying and covering the roof to a substantially vertical position wherein the aft portion of the first roof panel projects vertically into the van interior and a forward portion of the first roof panel projects through the roof opening above the van, and wherein the first roof panel is mounted for sliding movement forward to a position adjacent the cab section thereby forming a vertical, tall wall partition between the cab section and the rear passenger/cargo section;
 a retractable sub floor panel movably received within the floor of the van and horizontally movable along the longitudinal axis of the van to provide an extension of the van floor beyond the end of the van, and said rear doors being engagable with the sub floor panel in its extended position to form upstanding side walls for the extended floor region, and said rear doors each receiving in sliding engagement a retractable door which is movable from a fully retracted position in which it is totally enclosed within the rear door to a fully extended position, each retractable door being pivotally mounted on its associated rear door for swinging movement and to closing engagement with the sub floor panel, thereby defining a rear closure for the augmented passenger/cargo space;
 a second movable roof panel section pivotally mounted between the van side wall sections for rotational movement from a position overlying the van interior to a position overlying the sub floor panel in its extended position and engagable with the top edges of the rear door, thereby enclosing the augmented passenger/cargo section;
 a boat overlying the van interior and augmented passenger/cargo section, said boat having side edge portions disposed in slidable engagement with the roller channels and having a substantially vertical nose panel disposed in abutting engagement with the vertically projecting portion of the first roof panel wherein the boat defines an elevated roof for the van interior and completely overlies the augmented passenger/cargo section.

12. The van combination as defined in claim 11 including a frame housing mounted on the van roof above the cab compartment, a winch mounted on the portion of the roof overlying the cab section, a cable guide formed on the frame housing, and said winch having a cable extending along the cable guide and connected to said boat for drawing said boat along the channels into engagement with the vertical roof section, and for stabilizing movement of the boat as it is removed from the van.

13. In a van vehicle of the type having a forward cab section and a rear passenger/cargo section enclosed by upstanding side walls, an overhead roof section and rear doors which open and close a rear entrance to the passenger/cargo section, and an overhead opening formed in said roof along the length of the passenger/cargo section, the improvement comprising:
 a first overhead roof panel removably covering the forward portion of said overhead opening, the first overhead panel being releasably engaged with said roof section and being supported for rotation from the position overlying and covering the roof to a substantially vertical position wherein the aft portion of the first roof panel projects vertically into the van interior and a forward portion of the first roof panel projects through the roof opening above the van, and wherein the first roof panel is mounted for sliding movement forward to a position adjacent the cab section thereby forming a vertical, tall wall partition between the cab section and the rear passenger/cargo section;
 a retractable sub floor panel movably received within the floor of the van and horizontally movable along the longitudinal axis of the van to provide an extension of the van floor beyond the end of the van, and said rear doors being engagable with the sub floor panel in its extended position to form upstanding side walls for the extended floor region, and said rear doors each receiving in sliding engagement a retractable door which is movable from a fully retracted position in which it is totally enclosed within the rear door to a fully extended position, each retractable door being pivotally mounted on its associated rear door for swinging movement and to closing engagement with the sub floor panel, thereby defining a rear closure for the augmented passenger/cargo space;

a second movable roof panel section pivotally mounted between the van side wall sections for rotational movement from a position overlying the van interior to a position overlying the sub floor panel in its extended position and engagable with the top edges of the rear door, thereby enclosing the augmented passenger/cargo section;

a frame housing mounted on the van roof above the cab compartment, a winch mounted on the portion of the roof overlying the cab section, a cable guide formed on the frame housing, and said winch having a cable extending along the cable guide and connected to a plurality of upstanding arched support frames having opposite end sections slidably disposed within said channels on each side of the roof top opening; and, at least one arched support frame fastened in upstanding relation to the second roof panel section overlying the augmented passenger/cargo section, and a flexible, waterproof covering overlying the arched support frames and secured to the roof of the van.

14. The van as defined in claim 13, said cable being extended over the length of the van and supported by the arched support frames, said cable being attached to one of the rear arched support frames and subjected to tension loading, thereby providing longitudinal support for the flexible roof covering.

15. The van combination as defined in claim 13, said arched support frames being coupled to roller assemblies on each side of the rooftop opening, wherein each roller assembly comprises a yoke and a pair of longitudinally spaced rollers journalled for rotation on said yoke.

16. For use in a recreational van, a combination shower/toilet bucket seat assembly comprising, in combination:

a drainage tank formed beneath the floor of the van;

a stool mounted on the van floor above the drainage tank having a fluid drainage passage connected to the tank;

a toilet housing including a bowl connected to the opposite end of the stool;

first and second cushion sections mounted on the toilet housing for pivotal movement from a closed position overlying said bowl, to an open position providing access to the bowl;

each cushion section having an outer cushion layer and a water spray housing carried beneath the cushion layer, each water spray housing having a plurality of fluid discharge openings for directing a shower of water into the zone above the bowl when the cushion sections are fully open.

* * * * *